United States Patent
Kingston-Jones

(10) Patent No.: US 9,365,235 B2
(45) Date of Patent: Jun. 14, 2016

(54) STEERING COLUMN ASSEMBLY

(71) Applicant: TRW Limited, Solihull West Midlands (GB)

(72) Inventor: Harry George Kingston-Jones, Sussex (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 14/770,260

(22) PCT Filed: Feb. 27, 2014

(86) PCT No.: PCT/GB2014/050582
§ 371 (c)(1),
(2) Date: Aug. 25, 2015

(87) PCT Pub. No.: WO2014/132062
PCT Pub. Date: Sep. 4, 2014

(65) Prior Publication Data
US 2016/0001809 A1  Jan. 7, 2016

(30) Foreign Application Priority Data

Feb. 27, 2013  (GB) .................................. 1303513.4

(51) Int. Cl.
*B62D 1/19* (2006.01)
*F16F 7/12* (2006.01)

(52) U.S. Cl.
CPC ................ *B62D 1/195* (2013.01); *B62D 1/192* (2013.01); *F16F 7/123* (2013.01)

(58) Field of Classification Search
CPC .......... B62D 1/19; B62D 1/192; B62D 1/195; F16F 7/12; F16F 7/122; F16F 7/123
See application file for complete search history.

(56) References Cited

U.S. PATENT DOCUMENTS 5,609,364 A * 3/1997 Fouquet ................. B62D 1/195
                                                     280/777
5,720,496 A * 2/1998 Riefe ...................... F16F 7/123
                                                     188/371

(Continued)

FOREIGN PATENT DOCUMENTS

DE       19510615 A1    9/1996
FR       2775648 A1    9/1999

(Continued)

OTHER PUBLICATIONS

Patents Act 1977: Search Report Under Section 17(5), Application No. GB1303513.4, dated Jul. 11, 2013.

(Continued)

*Primary Examiner* — Faye M Fleming
(74) *Attorney, Agent, or Firm* — MacMillan, Sobanski & Todd, LLC

(57) ABSTRACT

A steering column assembly comprises a shroud which supports a steering column shaft, a support bracket assembly comprising at least a first support bracket which is arranged to be fixed to the shroud through a releasable clamp assembly and to be fixed to a fixed part of the vehicle through at least one frangible capsule, and at least one energy absorbing device that acts between the first support bracket and a fixed portion of the vehicle or the capsule and which in the event of a collapse of the steering column assembly that causes the capsule to break deforms so as to absorb energy and thereby at least partially control the collapse of the steering column assembly, the energy absorbing device comprising an elongate strip having two opposed ends and a central portion that is wound into a coil, the two free ends of the strip projecting away from the coil, a first end being secured to the first support bracket part and a second end being secured to the fixed part of the vehicle or the capsule, whereby in the event of a collapse of the steering column assembly following breaking of the capsule the two ends of the strip are pulled away from one another causing the coiled portion of the strip to at least partially become unwound.

16 Claims, 4 Drawing Sheets

(56) References Cited

U.S. PATENT DOCUMENTS

| | | | |
|---|---|---|---|
| 6,183,012 B1 | 2/2001 | Dufour et al. | |
| 6,578,872 B2* | 6/2003 | Duval | B62D 1/195 280/777 |
| 7,124,866 B2* | 10/2006 | Manwaring | F16F 7/128 188/371 |
| 2002/0020999 A1 | 2/2002 | Duval et al. | |
| 2005/0247533 A1* | 11/2005 | Manwaring | F16F 7/128 188/374 |
| 2008/0012281 A1* | 1/2008 | Cho | B62D 1/195 280/777 |
| 2008/0185830 A1* | 8/2008 | Ridgway | B62D 1/184 280/777 |
| 2014/0290423 A1* | 10/2014 | Kogure | B62D 1/195 74/493 |
| 2014/0352480 A1* | 12/2014 | Butler | B62D 1/184 74/493 |
| 2015/0021890 A1* | 1/2015 | Morita | B62D 1/195 280/777 |
| 2015/0232116 A1* | 8/2015 | Yokota | B62D 1/192 74/493 |

FOREIGN PATENT DOCUMENTS

| | | |
|---|---|---|
| JP | H1129049 A | 2/1999 |
| JP | 2001334944 A | 12/2001 |
| KR | 100614198 B1 | 8/2006 |
| KR | 20070063159 A | 6/2007 |

OTHER PUBLICATIONS

PCT International Search Report and Written Opinion, Application No. PCT/GB2014/050582, dated May 16, 2014.

* cited by examiner

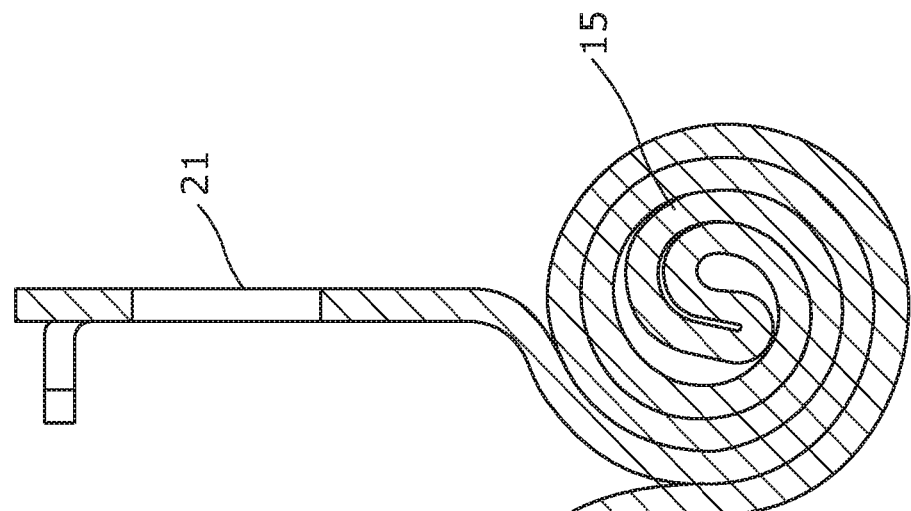
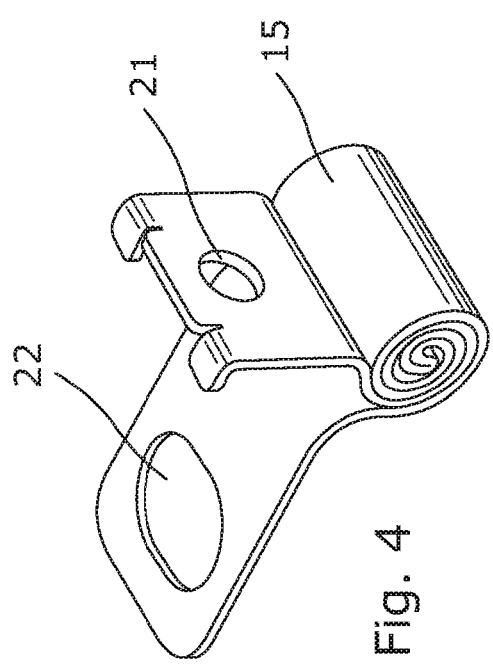
Fig. 4
Fig. 5

STEERING COLUMN ASSEMBLY

CROSS-REFERENCE TO RELATED APPLICATIONS

This application is a national stage of International Application No. PCT/GB2014/050582 filed Feb. 27, 2014, the disclosures of which are incorporated herein by reference in entirety, and which claimed priority to Great Britain Patent Application No. 1303513.4 filed Feb. 27, 2013, the disclosures of which are incorporated herein by reference in entirety.

BACKGROUND OF THE INVENTION

This invention relates to improvements in steering column assemblies of the kind including a support bracket that permits collapse during a crash. It also relates to steering assemblies including a support bracket.

Steering column assemblies for automotive vehicles and the like are increasingly required to be adjustable for steering wheel height known as rake and, in many cases, steering wheel distance known as reach. This requires the column shroud, within which the steering column shaft attached to the steering wheel is rotatably located, to be fixed to the vehicle by a clamp mechanism which can be locked and unlocked to either prevent or permit adjustment of the column shroud position respectively.

One common arrangement uses a telescopic column shroud which comprises an inner member and an outer member—typically two elongate metal tubes—which slide one inside the other to permit reach adjustment. Fixing rails are welded to one of the tubes and are secured to a first support bracket by a releasable clamp mechanism. The support bracket is in turn secured to a relatively immobile part of the vehicle chassis, often by securing the first support bracket to a second support bracket that is fixed to the vehicle. When the clamp mechanism is clamped the fixing rail and support brackets are fixed relative to one another. When unclamped they can move relative to one another to permit the required reach adjustment.

Rake adjustment can be achieved by providing a support bracket that is shaped like an inverted U and includes vertically extending slots in its side arms through which the clamp mechanism passes. The clamp mechanism can be moved vertically within these slots, taking the column with it to adjust rake.

In the event of a crash it is desirable for the steering column assembly to collapse in a controlled manner. This helps to reduce the forces of a driver colliding with the steering wheel or its airbag. A steering column which is arranged so that it can move during an accident is known as a collapsible steering column assembly.

In one known arrangement the controlled collapse of a telescopically adjustable steering column assembly is enabled by frangibly connecting the U bracket to the vehicle, or to the second support bracket, using one or more frangible capsules. In a crash the forces on the U bracket are sufficiently high to cause it to break away from the capsules thus permitting the U bracket to move relative to the vehicle or second support bracket.

To control the movement of the column during collapse, some form of energy absorbing device is typically provided that acts between the U bracket and the vehicle body. The energy absorbing device in use absorbs energy in the event of a collapse of the steering assembly. In this context, a collapse is defined as movement of the shroud beyond its normal range of adjustment due to the application of force through the steering wheel along the axis of the steering column shaft. This force will typically arise if a drivers body is impacted on the steering wheel in a crash. For a steering column assembly that is adjustable for reach the normal range of adjustment will correspond to the allowable reach adjustment of the steering and this should not be opposed by the energy absorbing device, since that would make the steering difficult to adjust for reach.

The energy absorbing device controls the movement of the support bracket. For example, a deformable strap may be fixed to the U-Bracket and may slide over a fixed anvil, causing progressive distortion of the strap in order to absorb energy. Whilst this arrangement can be very effective it has been found that in some cases it can provide packaging issues.

BRIEF SUMMARY OF THE INVENTION

According to a first aspect the invention provides a steering column assembly comprising:
a shroud which supports a steering column shaft,
a support bracket assembly for use in fixing the shroud to a vehicle, the support bracket assembly comprising at least a first support bracket which is arranged to be fixed to the shroud through a releasable clamp assembly and to be fixed to a fixed part of the vehicle through at least one frangible capsule,
and at least one energy absorbing device that acts between the first support bracket and the fixed portion of the vehicle or the capsule and which in the event of a collapse of the steering column assembly that cause the capsule to break deforms so as to absorb energy and thereby at least partially control the collapse of the steering column assembly;
characterised in that:
the energy absorbing device comprises an elongate strip having two opposed ends and a central portion that interconnects the end portions that is wound into a coil with the two free ends of the strip projecting away from the coil, a first end being secured to the first support bracket part and a second end being secured to the fixed part of the vehicle or the capsule,
whereby in the event of a collapse of the steering column assembly following breaking of the capsule the two ends of the strip are pulled away from one another causing the coiled portion of the strip to at least partially become unwound thereby controlling the collapse of the steering column assembly.

The energy absorbing device may be arranged so that upon during initial movement of the shroud along its axis during a collapse the force required to move the ends of energy absorbing device apart is relatively low and upon further movement the force required to move the ends of the energy device apart is increased.

The initial collapse movement may correspond to the movement required to break the capsule. In practice, the capsule may allow some movement over which it is deformed but not broken and the applicant appreciates that it may be desirable that the energy absorbing device does not provide a significant force resisting this breaking of the capsule.

The energy absorbing device may provide a substantially uniform resistance force after the initial travel. This force can be set by choosing the width and thickness of the strip along its length, the material of the strip and the cross section of the strip and the shape of the coil. Pulling on the two ends places the energy absorbing device in tension, and the resisting force is created as the strip resists deformation and resists unwinding of the coil.

The force after the initial travel may be at least double, or at least three times, or four times or more, the force provided during the initial travel when the end portions are bending but the coil is not unwinding.

The force provided by the energy absorbing device may be in a relatively low range for an initial collapse distance of up to 0.5 cm or up to 1 cm or perhaps up to 2 cm, and thereafter the force may be increased to a relatively high range of values. It may remain at the high range until the maximum allowed collapse movement has been achieved.

The strip may comprise a thin elongate planar strip which may have a thickness of between 0.3 mm and 2 mm. It may have a thickness of 0.5 mm or 1 mm. It may have a width of between 10 mm and 30 mm, for example 20 mm.

The strip may be folded back on itself at some position along its length between the two ends, such as a position at or near a midpoint of the strip, so that one strip portion overlays the other strip portion over substantially the whole length of the coiled part of the energy absorbing device, the two overlayed strip portions being coiled around the folded point in a spiral such that a centre line of the strip remains in a single plane.

The coil may be a tight coil with the surfaces of the two strip portions contacting one another in the coil.

In an alternative, instead of folding a single strip back on itself, the strip may comprise two discrete strip portions that are secured together by welding or bonding or any other suitable fastening technique.

The coil may pass through at least two full turns, or at least three or more full turns.

The strip may be ductile so that the action of unwinding the coil by pulling on the ends of the strip plastically deforms the strip thereby to absorb the energy in the steering system yet, when movement has stopped, provide a relatively low return force so the system is not pulled back. The energy absorbing device should therefore be configured so that when fully stretched it undergoes plastic deformation and preferably is configured so that any unwinding of the coil results in plastic deformation. For example, it may be arranged so that a force applied to energy absorbing member greater than 100 Nm at any point during collapse will cause it to deform plastically rather than within its elastic limit.

The strip may comprise a metal or metal alloy strip. It may comprise a steel strip, and may for example comprise DC04 C390 which is a cold Rolled mild steel.

The length of the strip that forms the coil may correspond approximately to the full collapse distance of the steering column assembly. It may be slightly less, a small amount of additional distance being permitted by deformation of the end portions of the device.

The end portions of the energy absorbing means may be spaced apart from the coiled part by a generally linear section of the strip. Each portion may have a length of at least 1 cm, or at least 2 cm or more.

The end portions may be connected to the bracket portions such that in the initial movement the resistance force is provided by bending of the generally linear section of the strip prior to the coil unwinding.

To help achieve this, one of the end portions may be spaced from the coil by a reverse bent portion of the strip, by which we mean a portion that has a curve that is in the opposite direction to the coil. This ensures that the reverse bent portion will initially straighten during collapse before a tensile force is applied to the coil to cause it to start to unravel.

The end portion of the strip that is secured to the first support bracket portion may extend generally perpendicular to the end portion of the strip that is secured to the fixed part of the vehicle.

The end portion that is secured to the first bracket may a nut or bolt or screw or rivet or stud. It may be welded or bonded to the bracket. There may be more than one nut or bolt or screw of rivet or stud.

The end portion that is secured to the second bracket may be secured by a nut or bolt or screw or rivet The end portion that is secured to the fixed part of the vehicle may be fixed in place by a fastener, such as a bolt, or a stud and nut, or perhaps a rivet, that in use secures the frangible capsule to the fixed part of the vehicle. This fastener may pass through a part of the capsule to fix the capsule in place. This is advantageous as it reduces costs by repurposing a nut or bolt that is already needed to secure the first bracket to the vehicle through the capsule. This also helps reduce the space required as it reduces the parts count.

The end portion may include an opening that receives the nut or bolt.

The support bracket may include a second bracket part that is rigidly fixed to the vehicle, the first bracket being fixed to the vehicle through the second bracket. This second bracket may be secured to the vehicle by one or more bolts. A suitable fixed part of the vehicle body in this context may be part of the bulkhead or a beam that is located behind the dashboard of the vehicle and forms a rigid part of the vehicle structure.

The first bracket may be secured to the fixed part of the vehicle by two frangible capsules. A respective energy absorbing device may be associated with each frangible capsule. Thus, for two capsules there may be two energy absorbing devices. An end portion of each energy absorbing device may be secured to the vehicle by the nut or bolt that secures the frangible capsule.

Where two or more energy absorbing members are provided they may be identical or have identical energy absorbing characteristics. They may be located on opposed sides of a centre line of the steering column assembly so that the force controlling the collapse is evenly balanced across the steering column shroud.

The shroud may comprise an upper portion and a lower portion, the upper portion being located an end of the shroud closest to a steering wheel of the steering assembly.

The upper portion may telescope relative to the lower portion. The lower portion may slide into the upper portion, or the upper portion may slide into the lower portion. This arrangement permits reach adjustment of the steering column assembly. When telescoping the shroud will move relative to the support bracket. Once in a desired position it may be secured using the clamp assembly. In a crash, the clamp assembly remains fixed and the support bracket will move with the shroud once the capsules have been broken.

The invention may be applied to other types of steering column assembly that might not have a telescopic shroud, but may include some other mechanism for permitting collapse when a driver impacts on the steering wheel in an accident, such as a shroud that can deform or otherwise move relative to the vehicle.

Other advantages of this invention will become apparent to those skilled in the art from the following detailed description of the preferred embodiments, when read in light of the accompanying drawings.

BRIEF DESCRIPTION OF THE DRAWINGS

FIG. 4 is a perspective view of one energy absorbing device prior to installation;

FIG. 5 is a view in cross section of the energy absorbing device of FIG. 4;

DETAILED DESCRIPTION OF THE INVENTION

Figure 1:
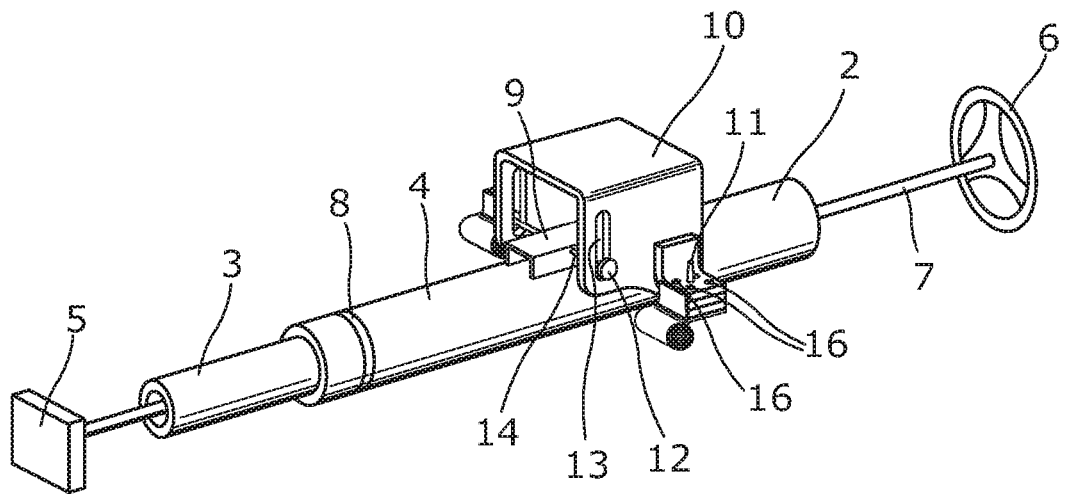
FIG. 1 is a view of steering column assembly in accordance with the present invention in an un-collapsed position.

As shown in FIG. 1 a steering column assembly 1 comprises a telescopic steering column shroud 2 comprising an inner member 3 and an outer member 4 which receives a portion of the inner member. The inner and outer members 3, 4 are metal tubes with the inside diameter of the outer member 4 being only slightly greater than the outside diameter of the inner member 3 so as to permit relative movement between them by sliding. In the example of FIG. 1 the inner member 3 passes into a gearbox housing 5 whilst the outer member 4 extends away from that towards a steering wheel 6. This housing 5 may contain a gearbox in the case of an electric power steering system which is driven by an electric motor to provide an assistance torque.

The steering wheel 6 is supported by a telescopic steering shaft 7 that is free to rotate within the steering column shroud 2. A bush (not shown) of low friction material such as a plastic is located between the inner and outer members 3, 4 to control the friction that is generated when the two are moved over one another to extend or collapse the steering column either when adjusting reach of the steering wheel 6 or in an accident.

The steering column shroud assembly 1 which may include a gearbox 5 at in the case of an electric power steering system is fixed pivotally to a part of the vehicle body at an axis 8 distal from the steering wheel 6. At a position closer to the steering wheel than this axis it is also fixed by a clamp mechanism 9 to a support bracket assembly 17 which is typically secured to the body of the vehicle by two or more vertical fasteners 11.

The support bracket assembly 17 is bolted in place in a region under the dashboard and the clamp mechanism clamps the shroud to the support bracket assembly 17 at a point 12 somewhere between the pivot axis and the steering wheel. The clamp mechanism can be locked or unlocked to allow the rake of the steering column 1 to be adjusted by pivoting about the pivot axis 13. In the case of the column 1 shown in FIG. 1 the reach position of the steering wheel 6 can also be adjusted through the provision of longitudinal slots in the clamping rails 9 which are attached to the outer shroud member. When locked the steering column 1 cannot be moved other than in an accident where it can collapse as described below.

Figure 2:
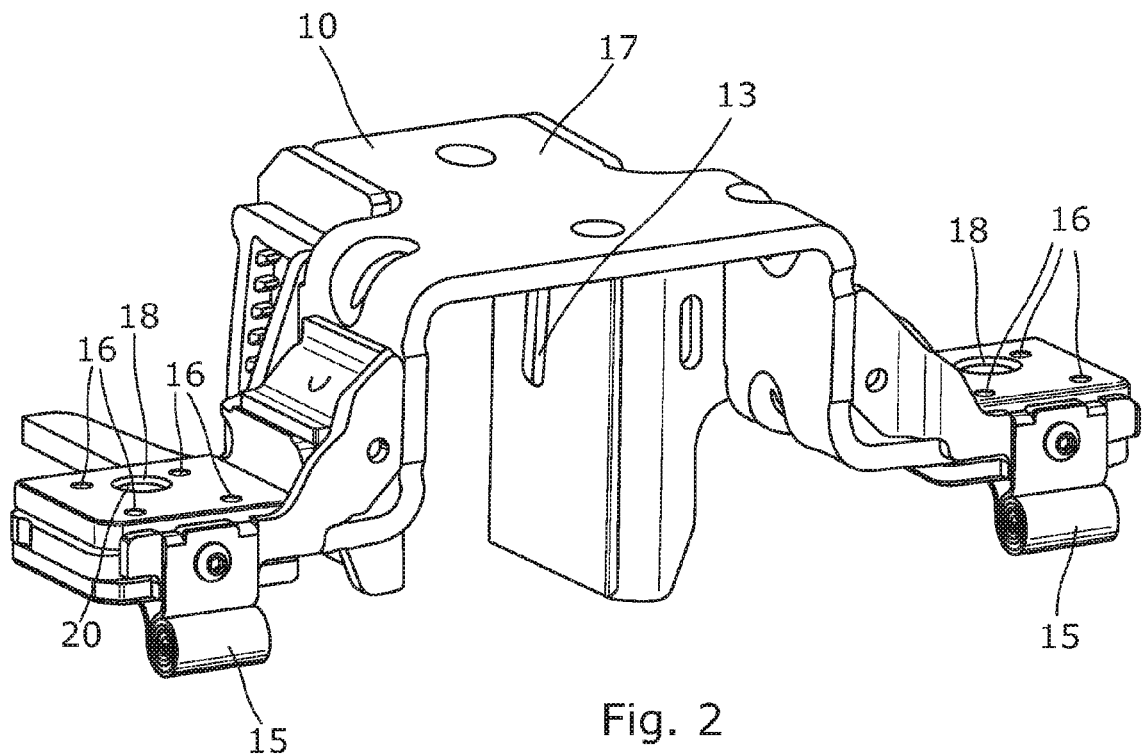
FIG. 2 is a perspective view of a support bracket, frangible capsules and energy devices of the steering column assembly of FIG. 1.

The support bracket assembly 17 is shown in FIG. 2 of the accompanying drawings. The support bracket is in two parts—a first support bracket 10 which is clamped to the shroud and a second support bracket 18 that is securely fixed to the vehicle. The two brackets are connected together by a pair of frangible capsules 16.

The first support bracket 10 is in the form of a metal sheet pressed into an inverted U-shape. The first support bracket 10 comprises a base of the U lying in a generally horizontal plane above the steering column shroud (not shown). Two arms of the U-shaped bracket 10 depend downwards in a generally vertical plane and extend down either side of fixing rails which are welded or are in some other way attached to the outer shroud member (not shown). The rails comprise two spaced vertical walls attached to the outer tube on opposing sides of an elongate slot 13.

A clamp mechanism (not shown) acts between the two arms of the U-shaped first bracket 10 part to draw them together when locked so that they are squeezed onto the walls of fixing rails. Many different types of clamp mechanism are known and so no further description is needed here. In one suitable arrangement shown in this embodiment the clamp mechanism includes a clamp pin that passes through elongate slots in the rail and the arms of the bracket to permit reach and rake adjustment. The steering column 7 perhaps only be adjustable for reach or rake, and the invention could even be applied to a steering column 7 which is not adjustable for reach or rake. If it is not adjustable for either reach or rake the clamp mechanism does not need to be adjustable in use and could merely provided a permanent connection of the shroud (not shown) to the U-shaped bracket 10.

Two wings 19 extend horizontally outwards from the bottom of the two arms, one from each arm. Each wing includes a female profile cut inward from one edge into which a frangible capsule 16 is received. This is shown in more detail in FIG. 3 of the drawings.

Each capsule 16 comprises a main body part that is cast or machined in the form of two larger plates between which is sandwiched a small central portion. The profile cut out from the first bracket part is typically designed to be a close fit to a corresponding male profile of the cut-out which is formed in the central portion of the capsule. After assembly of the capsule 16 to the wing 19 of the first bracket part 10, a frangible material such as a plastic is injected through holes (not shown) in the support bracket part and the capsule 16 which are co-axial. There may be more than one group of such coaxial holes. Once set, the plastic acts as a fusible dowel which is designed to shear when the said prescribed level of force is applied. In this embodiment the plate thickness of the wing of the support bracket part is slightly less than the gap between the upper and lower plate portions of the capsule so that a proportion of the injected plastic spreads into the said gap and improves the stiffness of the connection between the capsule 16 and the first bracket part 10.

The fusible capsule 16 defines an anchor point for a fastener (FIG. 1, 11)) which allows the support bracket part to be rigidly fixed to the vehicle. A hole 20 is provided in the capsule 16 which receives a fastening bolt (not shown). In a crash where a driver is thrown against the steering wheel (not shown), the force causes the steering shaft and shroud to collapse. This leads to a force being applied to the support bracket 10 by the clamp assembly along the axial direction of the shroud. If this force is sufficiently high it will break the frangible capsule 16 allowing the bracket 10 to move away from the capsule 16 and thus move relative to the vehicle body.

To control the movement of the shroud (not shown) after the capsules 16 have broken the apparatus further includes two energy absorbing devices 15. Each device is attached between the support bracket and the vehicle body through the capsule. The devices are identical in this embodiment and so only one device will be described in detail.

Figure 3:
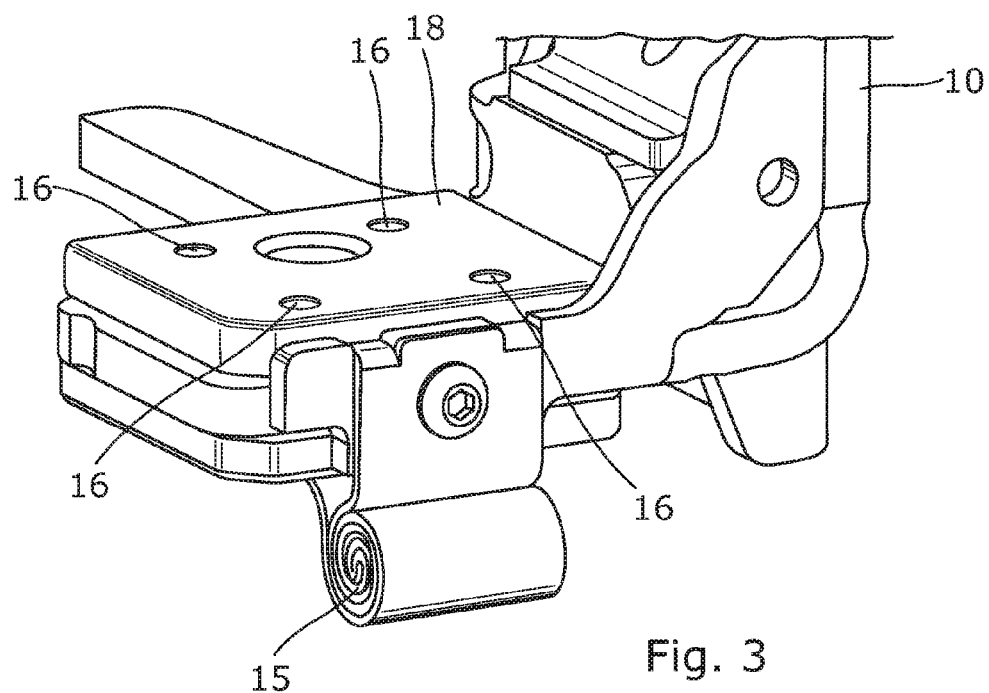
FIG. 3 is an enlarged view of one of the capsules and energy absorbing devices secured to the bracket.

The device 15 is shown prior to installation in FIGS. 4 and 5, and in the installed position in FIGS. 1, 2 and 3. In those figures it is shown prior to a collapse of the steering assembly 1.

The energy absorbing members interconnect the support bracket 18 and the vehicle (not shown), and are designed to elongate during movement of the shroud (not shown) whilst providing a controlled resistance to movement. The two energy absorbing members 15 are preferably identical, so for convenience only one will be described in detail.

An energy absorbing member 15 is shown in FIGS. 4 and 5 of the drawings. It comprises an elongate strip, with a thickness of around 1 mm and a width of around 20 mm. The width and thickness are uniform along the whole length of the strip, although in some arrangements the thickness and/or width may vary. The strip is bent back on itself midway along the strip so that two strip portions are defined, a face of one strip resting against a face of the other. The bent strip is the coiled around the folded part to form a tight coil of around two full turns. Two end portions of between 20 mm and 50 mm or so in length project away from the coiled portion at right angles to each other. The portion of strip between each end portion and coil is bent in a reverse direction to the coiled portion.

Each end portion includes an opening through which a fastener can pass 21, 22. One fastener secures a first end to the wing of the bracket as shown in FIG. 3. The other, second, end of the strip is secured to the vehicle by the bolt that passes through the capsule. To help locate the energy absorbing device in position during assembly the first end portion is folded through a right angle at the very end to form a tab. This fits into a recess in the wing of corresponding shape.

The energy absorbing device 15 in the embodiment is secured to the wing 18 using an M4 nut, but other fasteners could be used. For example, it could be welded in place, or a threaded stud may be provided on the wing 18 that passes through the end portion and receives a nut.

The strip is made of ductile material so that a force applied to the two ends that causes them to move apart is resisted by deformation of the strip. The strip is relatively inelastic and as such once deformed the strip will remain permanently in the new shape and will not try to spring back to its original shape.

In use, as shown in FIGS. 1 to 5, the energy absorbing device 15 rests with the coiled portion tightly coiled, the capsule intact and the two end portions extending at right angles to each other.

In the event of a driver striking the steering wheel 6, the shroud 2 will attempt to collapse under the load applied to the steering wheel 6. Initially this will be resisted by the capsules 16. The energy absorbing devices 15 will also provide some resistance but this will be relatively low compared to the capsules 16. As the collapse of the steering assembly 1 continues, the force applied to the wheel 6 by the driver will increase. Typically this happens very rapidly, i.e. over a period of a few tens to hundreds of milliseconds. Once the force reaches a predetermined threshold, the frangible capsules 16 will snap allowing the bracket 10 and shroud 2 to start to move relative to one another. At this time, the movement is no longer resisted by the capsules 16 but it is resisted by the energy absorbing devices 15.

Figure 6:
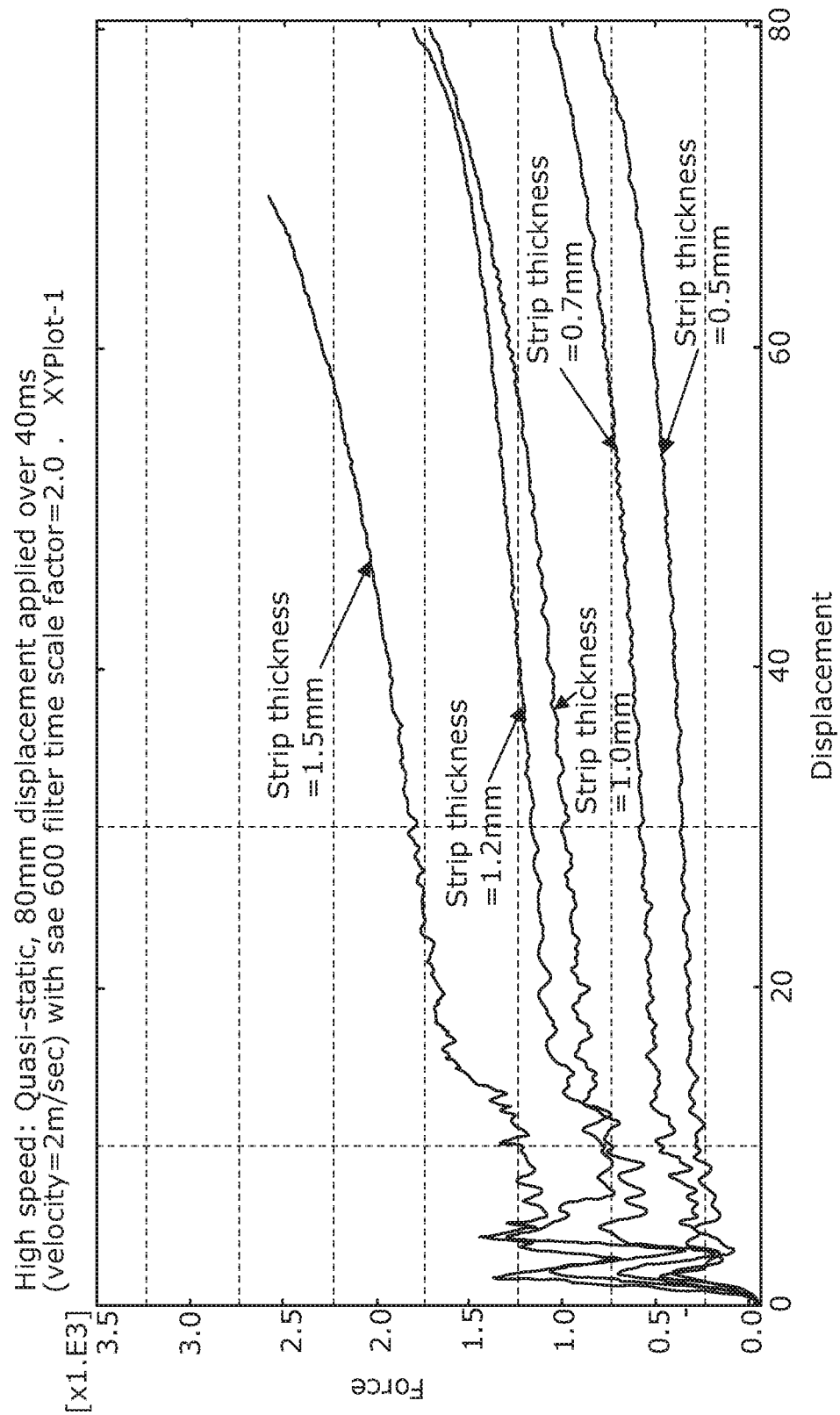
FIG. 6 is a graph showing the force absorbed by the steering column assembly during collapse for three pairs of differently dimensioned energy absorbing devices.

As the shroud moves 2, the ends of the energy absorbing device 15 are pulled away from each other. This places the energy absorbing device 15 in tension. Initially, this causes the end portion attached to the support bracket 10 to bend which requires a relatively low force. Once the end portion has bent so that the reverse bent part of the strip is straightened out, the coil will start to be pulled apart. This produces a much higher resisting force. A graph of force against collapse distance is shown in FIG. 6. It can be seen that the force is relatively low initially, increasing over the first few mm of crash travel before levelling off or at least increasing at a much slower rate with travel until the full travel of 80 mm is reached.

Figure 7:
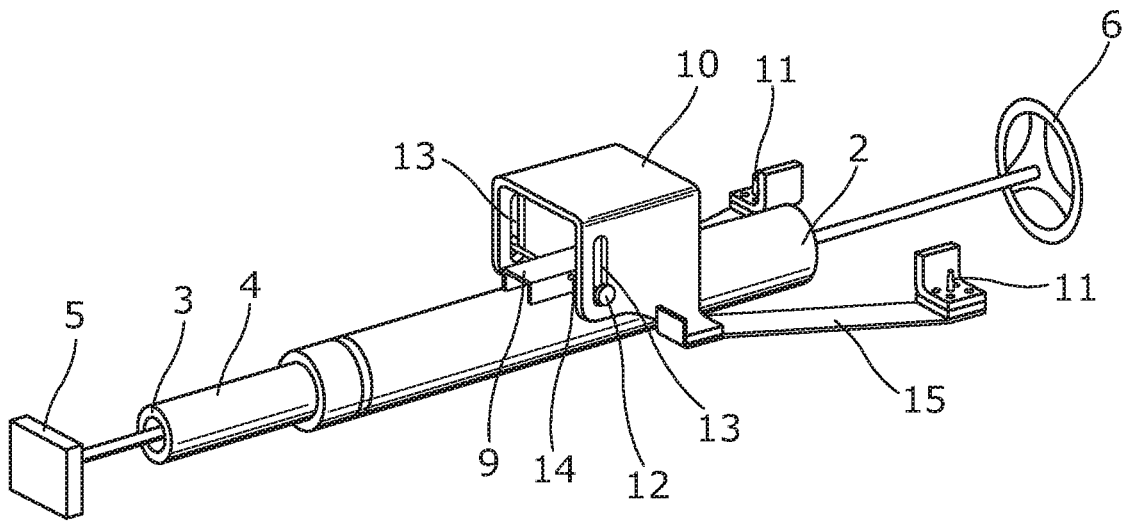
FIG. 7 shows the steering column assembly including the energy absorbing device, capsule and portion of the bracket corresponding to FIG. 1 after a full collapse of the shroud which has deformed the energy absorbing device.
Figure 8:
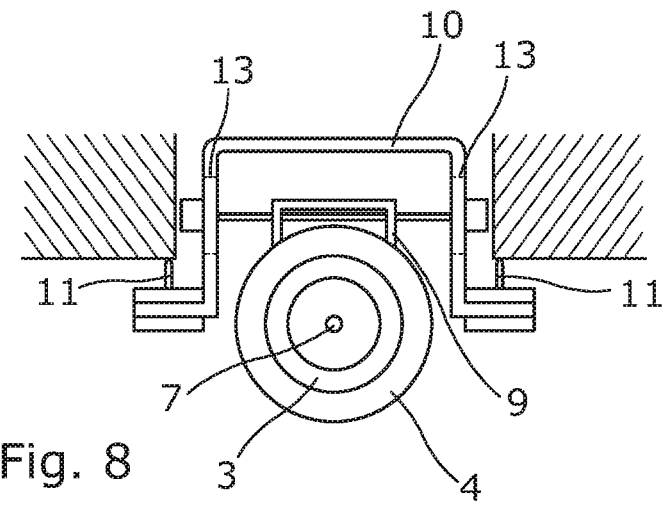
FIG. 8 is a cross section view of the assembly of FIG. 1.

The movement of the shroud 2 continues until the coil 15 is fully unravelled as shown in FIG. 7. Of course, the coil need not be fully unravelled and the movement of the steering may be limited by some other feature, such as a part of the steering striking a stopper.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising:
a shroud which supports a steering column shaft,
a support bracket assembly for use in fixing the shroud to a vehicle, the support bracket assembly comprising at least a first support bracket which is arranged to be fixed to the shroud through a releasable clamp assembly and to be fixed to a fixed part of the vehicle through at least one frangible capsule,
and at least one energy absorbing device that acts between the first support bracket and the fixed part of the vehicle or the capsule and which in the event of a collapse of the steering column assembly that causes the capsule to break deforms so as to absorb energy and thereby at least partially control the collapse of the steering column assembly;
wherein:
the energy absorbing device comprises an elongate strip having two opposed ends and a central portion that interconnects the two ends that is wound into a coil with the two ends of the strip projecting away from the coil, a first end being secured to the first support bracket part and a second end being secured to the fixed part of the vehicle or the capsule,
whereby in the event of a collapse of the steering column assembly following breaking of the capsule the two ends of the strip are pulled away from one another causing the coiled portion of the strip to at least partially become unwound thereby controlling the collapse of the steering column assembly.

2. The steering column assembly according to claim 1 in which the energy absorbing device is arranged so that during initial movement of the shroud along a shroud axis during collapse a force required to move the two ends of strip apart is relatively low and upon further movement the force required to move the two ends of the strip apart is increased.

3. The steering column assembly according to claim 2 in which the energy absorbing device provides a substantially uniform resistance force after the initial travel.

4. The steering column assembly according to claim 2 in which a resisting force created by the energy absorbing device after the initial travel is at least double a resisting force provided during the initial travel when the two ends are bending but the coiled portion is not unwinding.

5. The steering column assembly according to claim 2 in which the force provided by the energy absorbing device is in a relatively low range for an initial collapse distance of up to 0.5 cm in which coiled portion remains substantially coiled, and thereafter the force increases to a relatively high range of values as the coiled portion unwinds.

6. The steering column assembly according to claim 1 in which the strip comprises a thin elongate strip of regular cross section which has a thickness of between substantially 0.3 mm and 2 mm and a width of between substantially 10 mm and 30 mm.

7. The steering column assembly according to claim 1 in which the strip is folded back on itself at some position along a length between the two ends so that one strip portion overlays the other strip portion over substantially the whole length of the coiled portion of the energy absorbing device, the two overlayed strip portions being coiled around a folded point in a spiral such that a center line of the strip remains in a single plane.

8. The steering column assembly according to claim 7 in which the coiled portion is a tight coil with surfaces of the two ends contacting one another in the coil.

9. The steering column assembly according to claim 1 in which the coiled portion passes through at least two full turns.

10. The steering column assembly according to claim 1 in which the strip is highly ductile but relatively inelastic so that the action of unwinding the coiled portion by pulling on the two ends of the strip plastically deforms the strip thereby to absorb energy in the steering column assembly yet, when movement has stopped, the energy absorbing device provides a relatively low return force which would otherwise cause the energy absorbing device to return to an unloaded shape.

11. The steering column assembly according to claim 1 in which the strip comprises a metal or metal alloy strip.

12. The steering column assembly according to claim 1 in which the two ends of the energy absorbing device are spaced apart from the coiled portion by a generally linear section of the strip.

13. The steering column assembly according to claim 12 in which the two ends are secured to the bracket and the capsule or fixed vehicle portion such that in an initial collapse movement a resistance force is provided by bending of the generally linear section of the strip prior to the coiled portion unwinding.

14. The steering column assembly according to claim 1 in which one of the two ends is spaced from the coiled portion by a reverse bent portion of the strip.

15. The steering column assembly according to claim 1 in which the first end of the strip that is secured to the first support bracket extends generally perpendicular to the second end of the strip that is secured to the fixed part of the vehicle or capsule.

16. The steering column assembly according to claim 1 in which the capsule is secured to the fixed portion of the vehicle by a fastener and the second end of the strip is secured to the fixed part of the vehicle using the fastener.

* * * * *